United States Patent
Cigarini (10) Patent No.: US 12,082,526 B2
(45) Date of Patent: Sep. 10, 2024

(54) HEAD FOR BRUSH CUTTERS

(71) Applicant: TECOMEC S.R.L., Reggio Emilia (IT)

(72) Inventor: Enrico Cigarini, Reggio Emilia (IT)

(73) Assignee: TECOMEC S.R.L., Reggio Emilia (IT)

( * ) Notice: Subject to any disclaimer, the term of this patent is extended or adjusted under 35 U.S.C. 154(b) by 263 days.

(21) Appl. No.: 17/645,493

(22) Filed: Dec. 22, 2021

(65) Prior Publication Data

US 2023/0041171 A1      Feb. 9, 2023

(30) Foreign Application Priority Data

Jul. 30, 2021   (IT) .................. 102021000020462

(51) Int. Cl.
  *A01D 34/73*   (2006.01)
  *A01D 34/82*   (2006.01)

(52) U.S. Cl.
  CPC ........... *A01D 34/73* (2013.01); *A01D 34/828* (2013.01)

(58) Field of Classification Search
  None
  See application file for complete search history.

(56) References Cited

U.S. PATENT DOCUMENTS

| 2,924,058 A | 2/1960 | Brooks |
| 3,540,198 A | 11/1970 | Heth et al. |
| 3,703,071 A | 11/1972 | Anderson |
| 3,894,385 A | 7/1975 | Brown, Jr. |
| 3,918,241 A * | 11/1975 | Stillions ............... A01D 34/733 56/295 |
| 4,254,607 A | 3/1981 | Moore |
| 4,351,144 A | 9/1982 | Benenati |
| 5,430,943 A | 7/1995 | Lee |

(Continued)

FOREIGN PATENT DOCUMENTS

| AU | 522302 B2 | 5/1982 |
| DE | 20113298 U1 | 2/2002 |

(Continued)

OTHER PUBLICATIONS

English translation of KR 10-1695386, dated Jan. 5, 2017.*

(Continued)

*Primary Examiner* — Hwei-Siu C Payer
(74) *Attorney, Agent, or Firm* — Pearne & Gordon LLP; J. Gregory Chrisman (57) ABSTRACT

A head (1) for a brush cutter of the type comprising a support element (3), connectable to a drive shaft of a brush cutter so as to be set in rotation about a vertical rotation axis (Y-Y), a plurality of pins (9), connected to the support element (3), couplable to a plurality of cutting elements (2), so that every cutting element (2) is free to rotate about the respective pin (9) defining a cutting generatrix (S). The plurality of cutting elements (2) being arranged in such a way as to provide the respective cutting generatrices (S) tangent, in the part distal to the vertical rotation axis (Y-Y), to an overall cutting diameter (Db), defining the overall cutting surface of the head, and tangent, in the part proximal to the vertical rotation axis (Y-Y), to a fictitious circumference (A), defining a central portion of the support element (3) not reached by the plurality of cutting elements (2). The (A/Db) ratio being comprised between 0.06 and 0.3.

9 Claims, 9 Drawing Sheets

(56) References Cited

U.S. PATENT DOCUMENTS

| | | |
|---|---|---|
| 5,493,785 A | 2/1996 | Lawrence |
| 5,617,636 A | 4/1997 | Taggett |
| 5,619,846 A | 4/1997 | Brown |
| 5,622,035 A | 4/1997 | Kondo |
| 5,722,172 A | 3/1998 | Walden |
| 5,875,700 A | 3/1999 | Powell |
| 6,105,351 A | 8/2000 | Itoh |
| 6,112,416 A | 9/2000 | Bridges |
| 6,119,350 A | 9/2000 | Sutliff |
| 6,446,346 B1 | 9/2002 | Castleman |
| 6,817,102 B2 | 11/2004 | Harris |
| 6,827,152 B2 | 12/2004 | Iacona |
| 6,912,789 B2 | 7/2005 | Price, III |
| 7,171,798 B1 | 2/2007 | Bernardy |
| 8,069,758 B2 | 12/2011 | Zhang |
| 8,136,333 B1 | 3/2012 | Levin |
| 8,640,588 B2 | 2/2014 | Strader |
| 8,667,695 B2 | 3/2014 | Yamaoka |
| 8,769,831 B2 | 7/2014 | Duvall |
| 8,863,395 B2 | 10/2014 | Alliss |
| 9,010,078 B2 | 4/2015 | MacDonald |
| 10,278,327 B2 | 5/2019 | Skinner |
| 10,531,609 B2 | 1/2020 | Jerez |
| 10,645,871 B2 | 5/2020 | Arnetoli |
| 10,709,062 B2 | 7/2020 | Chang |
| 11,388,856 B2 | 7/2022 | Jerez |
| 11,528,843 B2 | 12/2022 | Nolin |
| 2009/0038163 A1 | 2/2009 | Jerez |
| 2012/0066912 A1 | 3/2012 | Ferrell |
| 2018/0295775 A1 | 10/2018 | Kang |
| 2020/0045881 A1 | 2/2020 | Cigarini et al. |
| 2022/0272897 A1 | 9/2022 | Jiao |
| 2023/0033928 A1* | 2/2023 | Cigarini ............... A01D 34/84 |
| 2023/0041171 A1* | 2/2023 | Cigarini ............... A01D 34/73 |
| 2023/0157206 A1 | 5/2023 | He |
| 2023/0264279 A1 | 8/2023 | Patil |

FOREIGN PATENT DOCUMENTS

| | | | |
|---|---|---|---|
| EP | 3607812 A1 | | 2/2020 |
| FR | 2717037 A1 | | 9/1995 |
| IT | 201900004591 A1 | | 9/2020 |
| JP | 109262020 A | | 10/1997 |
| KR | 10-1695386 | * | 1/2017 |
| KR | 10-2017-0056960 | * | 5/2017 |
| KR | 10-2018-0041371 | * | 4/2018 |
| KR | 10-2021-0094682 | * | 7/2021 |
| WO | 2014007688 A1 | | 1/2014 |

OTHER PUBLICATIONS

English translation of KR 10-2017-0056960, dated May 24, 2017.*
English translation of KR 10-2018-0041371, dated Apr. 24, 2018.*
English translation of KR 10-2021-0094682, dated Jul. 30, 2021.*

* cited by examiner

$\omega_b = \omega_u\left(1+\frac{Da}{Db}\right)$ $\omega_b \uparrow\uparrow \rightarrow Da \gg Db$

Fig.3

$H = f\left(\frac{A}{B}\right)$ $H\uparrow\uparrow \rightarrow A\uparrow\uparrow$

HEAD FOR BRUSH CUTTERS

FIELD OF THE INVENTION

The invention relates to a cutting head for brush cutter machines.

BACKGROUND OF THE INVENTION

Machines for cutting vegetation, such as brush cutters, can use different types of cutting tools, depending on the type of vegetation to be cut. The cutting tools are fixed in a cutting head, coupled to a rotating shaft of the brush cutter. When rotated with the cutting head about the axis of the shaft, the tool covers a circular surface which extends around the axis of the shaft, the diameter of this surface is called the cutting diameter. Said cutting diameter is the diameter of the circle described by the end of the cutting tool during the rotation of the cutting head.

Cutting filaments are a first type of cutting tool, among the most common, intended mainly for cutting grass or edging. Such cutting filaments are generally made of plastic obtained from an extrusion process. At least one filament is fixed in the cutting head and a free end of the filament exits from the head through an eyelet. Cutting filaments can have several drawbacks. Firstly, such filaments are prone to abrasion or breakage, thus requiring frequent filament changes, which is annoying and time consuming. Furthermore, the energy consumption is high for large filament diameters. Furthermore, due to its flexibility, the filament tends to slam during its rotation, which generates a noticeable noise, requiring the user to wear individual hearing protection. Lastly, the cutting heads configured to receive the filaments usually have a complex design and can be difficult to use, especially for non-professional users.

Plastic cutting blades are another type of cutting tool, among the most common, having a shape similar to the blade of a knife and intended mainly for cutting dense or hard vegetation. However, such cutting blades are affected by several disadvantages. Firstly, the blade can break into several pieces following an impact on a particularly hard obstacle, such as a stone, a log or a tree trunk, etc. These pieces can be projected several metres around the cutting head with the risk of seriously injuring the user or other people nearby. Furthermore, depending on the shape of the blades and the way they are fastened to the cutting head, the energy consumption of the brush cutter can be very high. Lastly, the cutting blades are usually much more expensive than the cutting filaments. Metal discs are a further type of cutting tool, less common than the previous ones because they are mainly used in regions with dense or dry vegetation. Metal discs also have a number of drawbacks including, in particular, the generation of sparks resulting from contact with a stone, which can trigger a fire. Furthermore, such discs are very dangerous to use due to the high risk of injury. Lastly, similar to plastic cutting blades, metal discs can also break into different pieces following an impact with a hard obstacle.

To date, none of the above-mentioned cutting tools provides a fully satisfactory solution.

A solution belonging to the prior art, but not particularly widespread in the current market of spare parts for brush cutter heads, is described in U.S. Pat. No. 3,894,385 where a head is illustrated provided with a plurality of cutting elements which can rotate around the axis thereof.

This particular type of head and the relative cutting elements is not without disadvantages.

In particular, the Applicant was able to verify how a head provided with the cutting elements illustrated in U.S. Pat. No. 3,894,385 determines an uneven head profile given the alternation of peaks, defined by the individual cutting generatrices of the cutting elements placed in rotation, and depressions, defined by the empty spaces existing between one tool and the other.

The uneven profile of the overall cutting diameter penalises the cutting performance of the brush cutter and, in the event of an impact, can more likely cause damage and breakage of the cutting elements.

This uneven profile could be resolved by distributing a larger number of cutting tools on the periphery of the head than the set of tools illustrated in U.S. Pat. No. 3,894,385. This would create a head with a more uniform external profile but again not entirely free from disadvantages. In fact, the operation of replacing the cutting elements, which during the cutting of grass tend to be consumed, would be quite laborious with consequent long machine downtime.

BRIEF SUMMARY OF THE INVENTION

Therefore, an object of the invention is to design a cutting head which overcomes the above-mentioned disadvantages related to the existing cutting tools, providing the head with a plurality of cutting elements which have a good cutting efficiency, which are able to minimise the vibrations induced to the brush cutter, in case of impact against an obstacle, and which are able to minimise the energy consumption of a brush cutter.

To this end, the object of the invention is to define a cutting head for a brush cutter.

In the present text, the term "planar" means that the cutting element generally extends in at least two directions of a plane, as opposed to a cutting filament which is considered, in the context of the present text, as a linear cutting tool, as it extends mainly along a main direction of a plane. In particular, the cutting edge extends in a plane. Said plane is typically perpendicular to the axis of rotation of the disc.

In the present text, the term "coplanar" means that a group of cutting elements lies on the same plane or at the same height with respect to a reference surface.

In the present text, the term "freely rotatable" means that the cutting element can make full rotations about the pin (a full rotation covering an angular sector of 360°), in both directions. In this regard, the cutting head does not comprise any component capable of limiting the rotation range of the cutting element. When the cutting head rotates within a certain speed range, the centrifugal force applied to the cutting element can cause it to block against the pin by means of a support pillar. Thus, the cutting element rotates at the same speed as the head and acts as a cutting edge of the head. However, in the event of an impact on a significant obstacle, the force exerted by the obstacle on the cutting element can cancel the action of the support pillar and rotate the element in a direction opposite the rotation direction of the head, which prevents the breakage of the cutting element and reduces the energy consumption of the machine because the rotation speed of the head remains always constant despite the impacts with the vegetation.

The dependent claims correspond to possible embodiments of the invention.

BRIEF DESCRIPTION OF THE SEVERAL VIEWS OF THE DRAWINGS

Further features and advantages of the present invention will become more apparent from the following indicative and therefore non-limiting description, of a preferred but not exclusive embodiment of a head for brush cutters as illustrated in the accompanying drawings in which:

FIGS. 11-13 illustrate a head for brush cutters, in accordance with the present invention, made according to the geometric sizing of FIGS. 6-7 in a first embodiment in which FIG. 11 shows a perspective view, FIG. 12 an exploded view and FIG. 13 a cross-sectional view;

FIGS. 14-16 illustrate a head for brush cutters, in accordance with the present invention, made according to the geometric sizing of FIGS. 6-7 in a second embodiment in which FIG. 14 shows a perspective view, FIG. 15 an exploded view and FIG. 16 a cross-sectional view.

DETAILED DESCRIPTION OF THE INVENTION

In the accompanying drawings, a head for brush cutters in accordance with the present invention is indicated in its entirety by the number 1.

Figure 1:
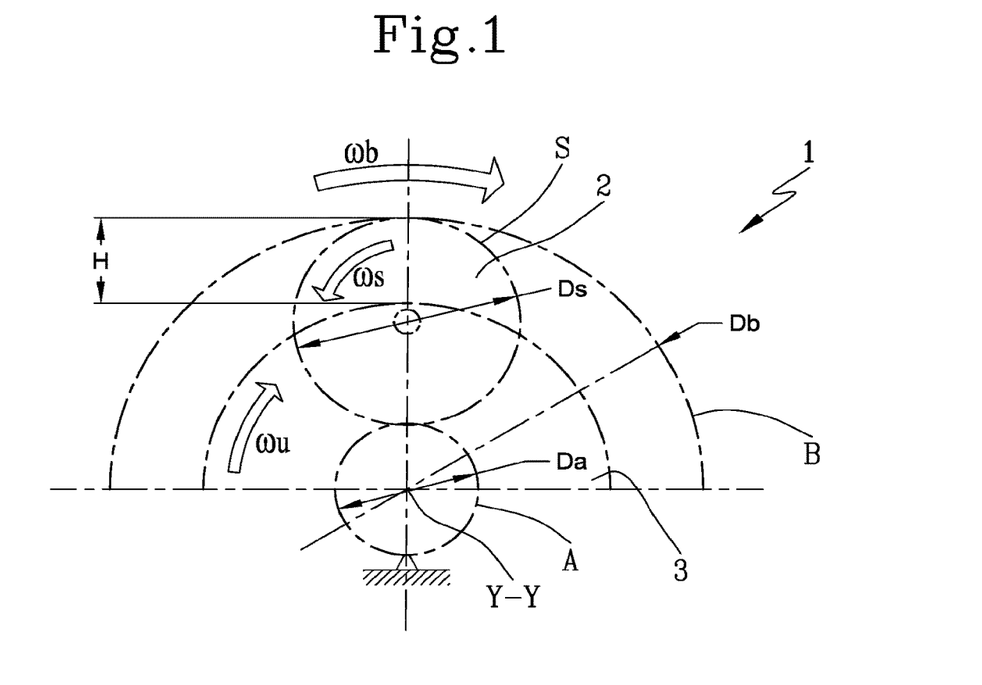
FIG. 1 is a diagram in which a head, viewed in plan view, has been approximated to a planetary gearbox.

FIG. 1 is a schematic plan view of the head 1 with a support element 3 and a plurality of cutting elements 2 (only one cutting element is depicted in FIG. 1 for representative simplicity).

The support element 3 is rotationally connected to a drive shaft (not shown in the figures, as known) and has a vertical rotation axis Y-Y about which the support element 3 rotates.

As visible in the accompanying drawings, the support element 3 is preferably circular in shape.

The support element 3, when driven by the drive shaft, rotates about the vertical axis Y-Y thereof with an angular speed wu.

As a result of the rotation of the support element 3, the plurality of cutting elements 2 can also rotate.

More precisely, each cutting element 2 belonging to the plurality of cutting elements, during the rotation of the support element 3, describes a rotary motion around the rotation axis y-y thereof, in FIG. 1 perpendicular to the plane of the sheet, defining a cutting generatrix S having a circular shape and diameter Ds.

Db indicates the overall cutting diameter obtained by drawing a circumference tangent in the external part of the cutting generatrices S defined by each cutting element 2. In order for the cutting diameter to be tangent to all the cutting generatrices of the cutting elements 2, a geometric condition is preferred for which each cutting element 2 has the rotation axis y-y thereof on a circumference having the vertical axis Y-Y of the support element 3 as its centre.

In FIG. 1 the circumference B has a cutting diameter Db.

A indicates a fictitious circumference, tangent in the inner part of the cutting generatrices S defined by each cutting element 2 and having a diameter equal to Da.

Following the diagram, Db is the overall cutting diameter obtained from the circumference B tangent to the cutting generatrices S and distal to the vertical axis Y-Y, A is a circumference tangent to the cutting generatrices S in the part proximal to the vertical axis Y-Y representing the central portion of the support element not reached by the plurality of cutting elements 2.

In this context, the Applicant has designed the system illustrated in FIG. 1 comparing it to a planetary system, thus identifying, in the plurality of cutting elements 2, the satellites, in the grass, external to the cutting diameter Db, the crown, in the fictitious circumference A the central pinion also called the sun.

Through this kinematic parallelism, the Applicant has assessed how to maximise the angular speed wb so as to maximise the impact with grass.

To maximise the angular speed wb, it is possible to apply the Willis formula thus obtaining: $\omega b = \omega u*(1+A/Db)$ with A and B respectively the circumference of the fictitious sun and the overall cutting diameter of the head.

To maximise the angular speed, through the Willis formula, it is necessary to vary the values given by the ratio A/Db and therefore, in one case, obtain large values of A and, in the opposite case, obtain small values of B.

Figure 2:
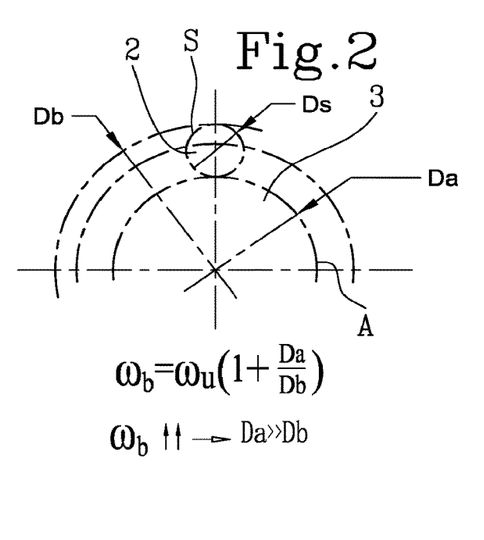
FIGS. 2 and 3 illustrate two geometric diagrams deriving from the analysis of FIG. 1 in which two different design parameters of the head were considered.

The first case, large values of A leads to a configuration as shown in FIG. 2. The second case, small values of B, was not taken into account because it is equivalent and drastically reduces the cutting diameter and therefore obtains a head which, with equal passages on the ground, covers a small area of grass to be cut.

The solution illustrated in FIG. 2, i.e., large values of A, is consistent with the prior art document U.S. Pat. No. 3,894,385 which highlights the presence of a plurality of cutting elements about a fictitious circumference A, with a diameter Da greatly larger than the diameter of the satellites and therefore the respective cutting diameters Ds defined by the respective cutting generatrices S.

Subsequently, the Applicant studied the same model by setting a maximisation of the passage depth, indicated in FIG. 1 with H, in order to cut much more grass for each revolution of the head 1.

Figure 3:
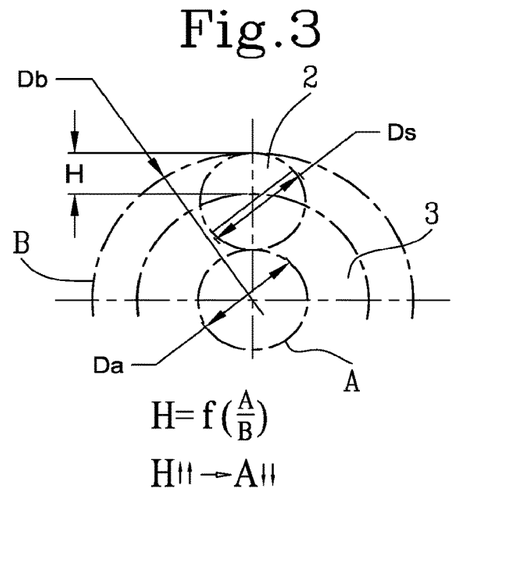

In this context, it can be noted that H is, again, a function of the ratio A/Db with increasing behaviour as A decreases, A diagram representative of the ideal condition of the head 1 with the maximised passage depth H is shown in FIG. 3.

At this point, the Applicant carried out a kinematic study of the head 1, providing it with a plurality of cutting elements 2.

Figure 4:
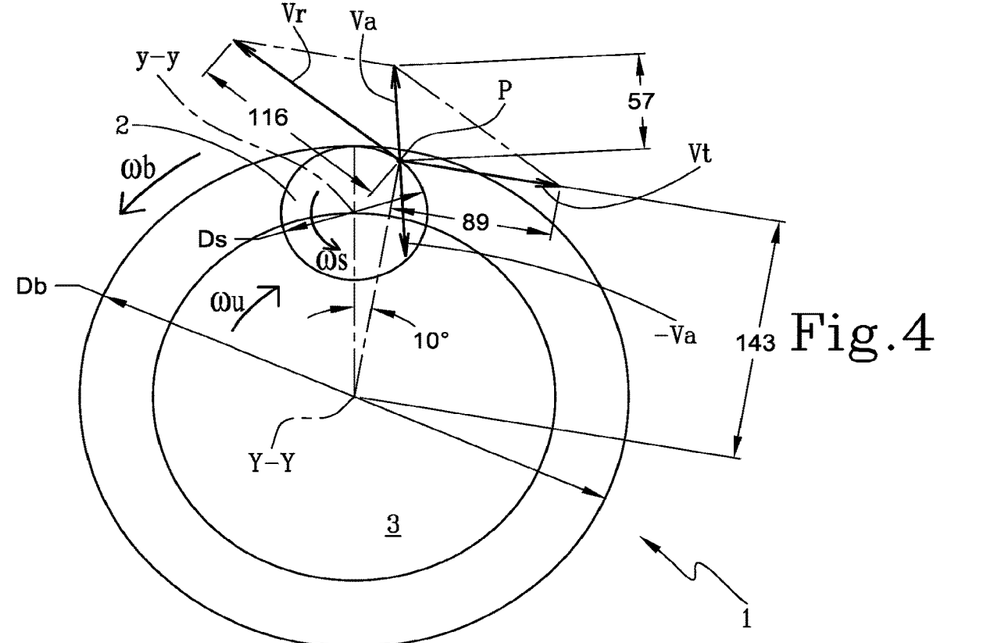
FIG. 4 illustrates a kinematic study of a head for brush cutters provided with cutting elements having a configuration derived from the diagram of FIG. 2 with dimensions and location similar to that of the prior art.
Figure 5:
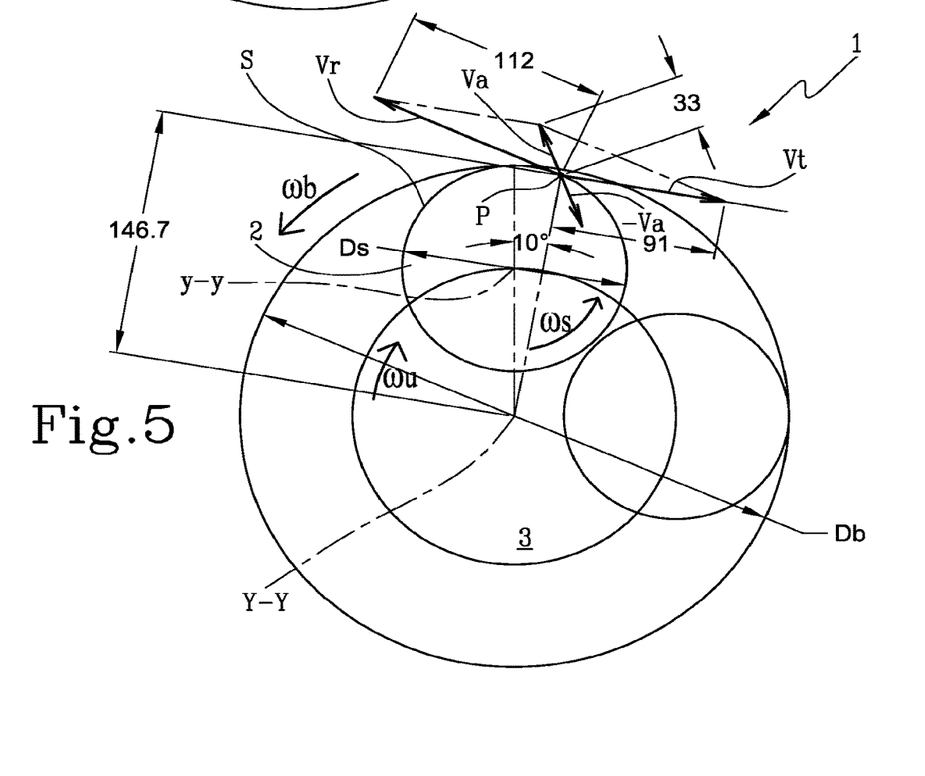
FIG. 5 illustrates a kinematic study of a head for brush cutters provided with cutting elements having a configuration derived from the diagram of FIG. 3.

FIG. 4 illustrates a kinematic study of the head 1 as suggested by the modelling of FIG. 2 and FIG. 5 illustrates a kinematic study of the head 1 as suggested by the modelling of FIG. 3.

The kinematic studies illustrated in FIGS. 4 and 5 analyse the behaviour of the head, set in both cases with the same overall cutting diameter B, and of the cutting element 2 in the event of an impact with an obstacle.

For representative and comparative uniformity between FIGS. 4 and 5, the impact was located through the intersection of a straight line, passing through Y-Y and inclined by 10° with respect to the vertical direction, with the cutting generatrix S.

By applying the speed composition formula it is possible to understand how the point P is subject to a dragging speed Vt, with respect to the rotation axis of the cutting element 2 passing through the axis of vertical symmetry Y-Y is a relative speed Vr, with respect to the rotation axis of the cutting element 2 passing through the axis y-y.

The result of the two speeds is the absolute speed Va, also represented in the opposite direction, −Va, as a reaction induced by the impact on the head and therefore on the brush cutter.

FIG. 5 shows the same kinematic study and the similar depiction of the dragging speed Vt, relative speed Vr and absolute speed Va, together with the equal and opposite absolute speed.

By comparing the two figures it is possible to reach this comparative table:

| Data of FIG. 4 | | Data of FIG. 5 | |
|---|---|---|---|
| Distance YY-P | 146.7 mm | Distance YY-P | 143 |
| Diameter 2 | 220 | Diameter 2 | 177 |
| Diameter 3 | 80 | Diameter 3 | 123 |
| Vt | 89 m/s | Vt | 91 m/s |
| Vr | 116 m/s | Vr | 112 m/s |
| Va | 57 m/s | Va | 33 m/s |

The comparison in the table allows to ascertain how the configuration of FIG. 5 is to be preferred for two disjointed reasons: the safeguarding of the integrity of the cutting element and the lower number of vibrations induced to the brush cutter.

In other words, from the table it is possible to ascertain how, with a substantially equal distance YY-P, the value of the absolute speed in the example of FIG. 4 corresponds to about twice the value of the absolute speed in the example of FIG. 5. This is equivalent, in the event of an impact of an obstacle with the cutting element 3, to a stress of double the entity transmitted to the cutting element of FIG. 1, with respect to that transmitted to the cutting element of FIG. 2, and double the entity of vibrations, induced to the brush cutter, to the head of FIG. 1 with respect to the head of FIG. 2.

At this point, the Applicant continued modelling the head, maintaining the analogy with the planetary gearbox system.

Therefore, taking advantage of the analogy with the planetary gearbox system, defining with S the cutting generatrices of each cutting element 2 and plotting with Db the overall cutting diameter, externally tangent to the cutting generatrices S of each cutting element 2, and with A the fictitious circumference, internally tangent to the cutting generatrices S of each cutting element 2 and representing the central portion of the support element 3 not reached by the plurality of cutting elements 2, the Applicant determined a ratio A/Db comprised between 0.06 and 0.3 (or 0.06<A/Db<0.3).

In particular, by setting a number of cutting edges equal to 3, with a radially distributed arrangement at 120°, the Applicant has determined an optimal ratio A/Db comprised between 0.06 and 0.15 and by setting a number of cutting edges equal to 4, with a radially distributed arrangement at 90°, an optimal ratio A/Db comprised between 0.16 and 0.3.

By means of the modelling performed, the Applicant has determined that the ratio A/Db comprised between 0.06 and 0.3 results in a better cutting performance of the cutting elements 2 and a reduction of the vibrations to the head 1, and therefore to the brush cutter, in case of impact against an obstacle.

Figure 6:
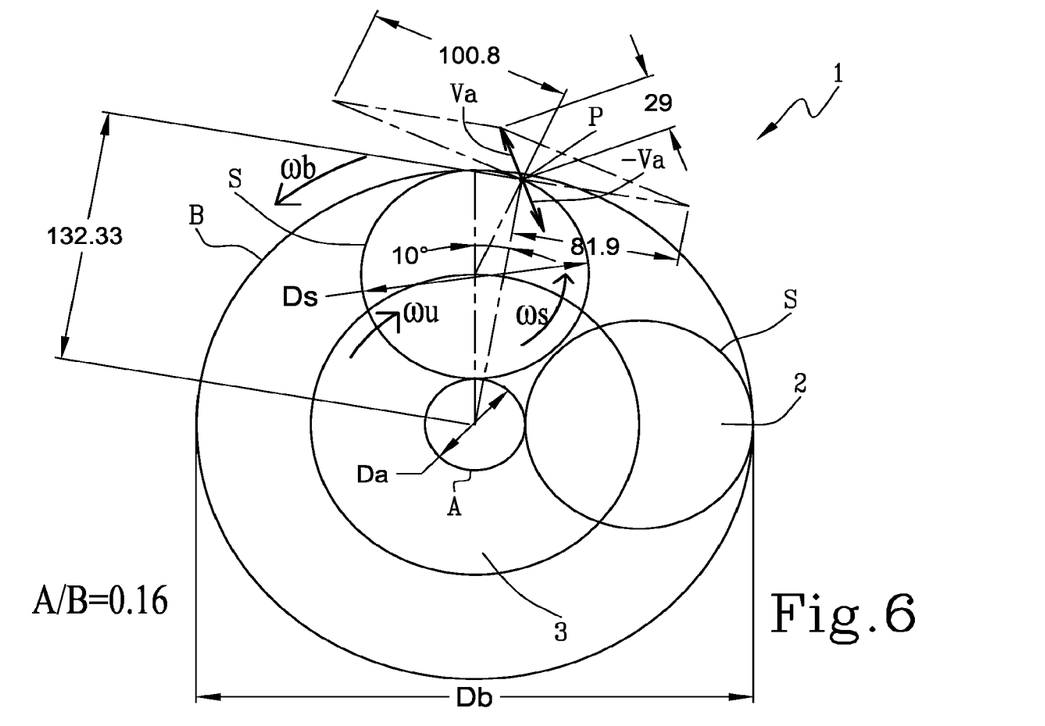
FIGS. 6-7 illustrate a geometric sizing of a head for brush cutters provided with a first configuration of cutting tools.
Figure 7:
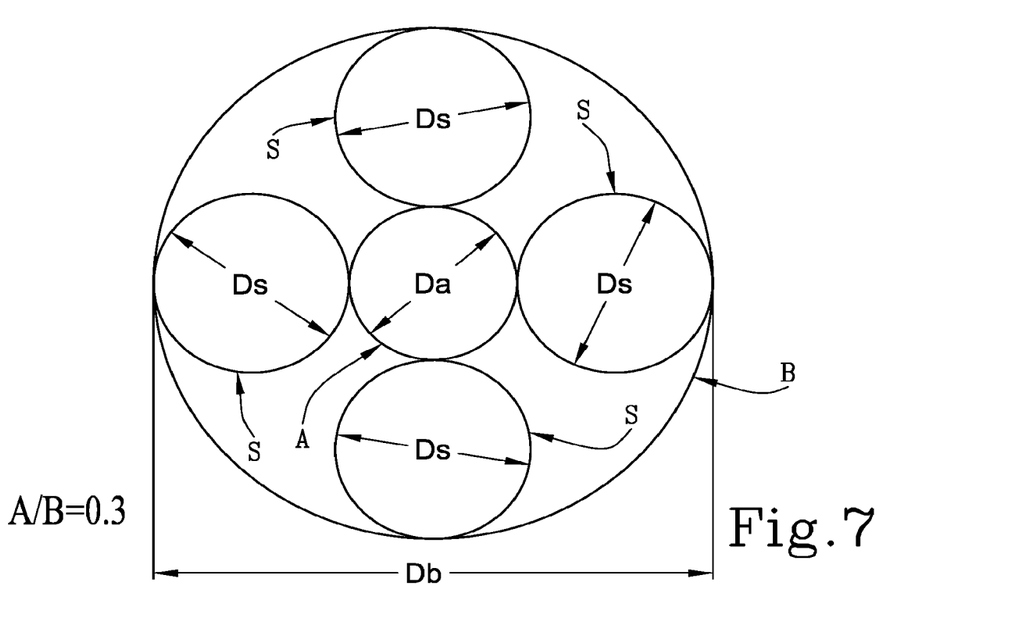
Figure 8:
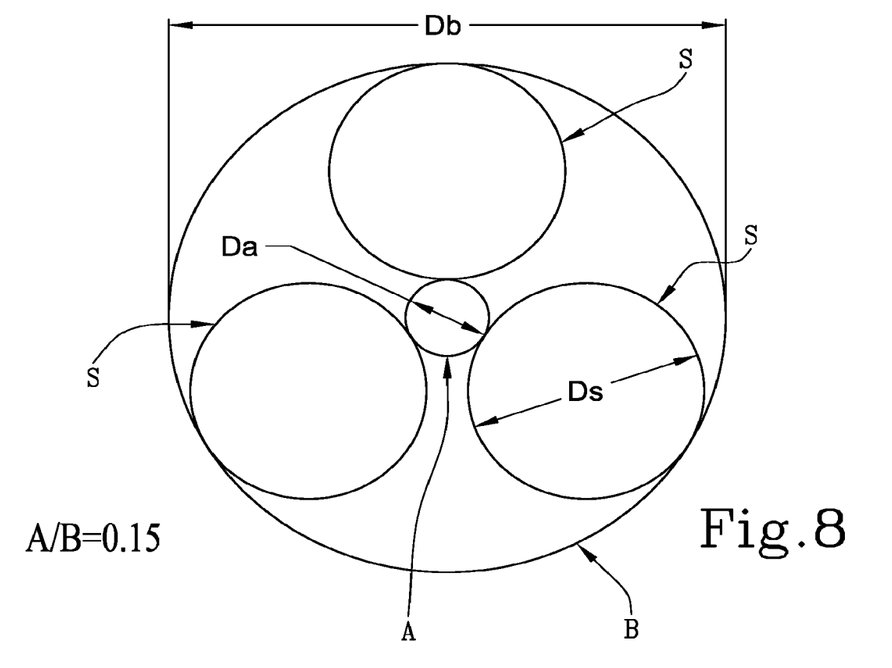
FIGS. 8-10 illustrate a geometric sizing of a head for brush cutters provided with a second configuration of cutting tools.
Figure 9:
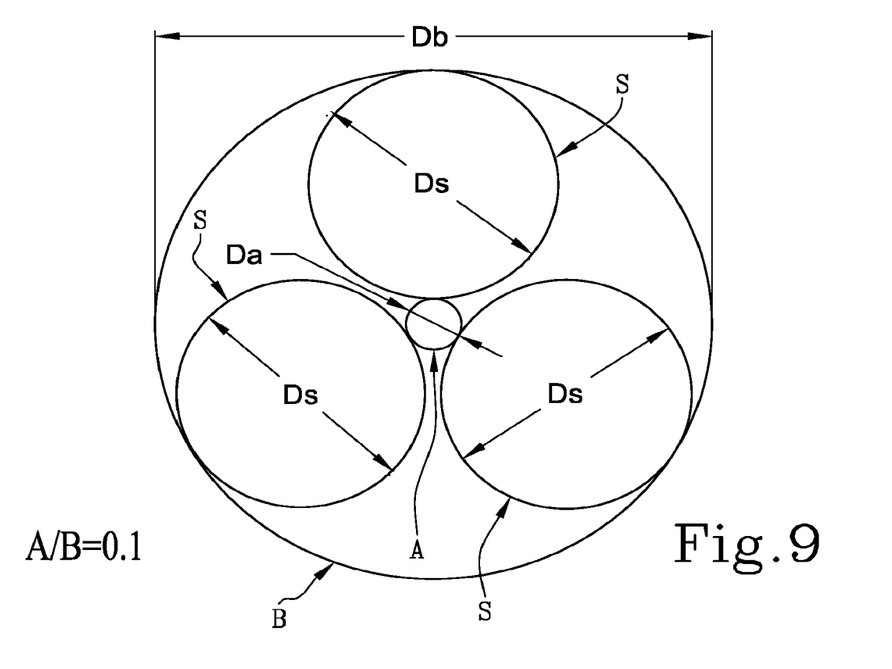
Figure 10:
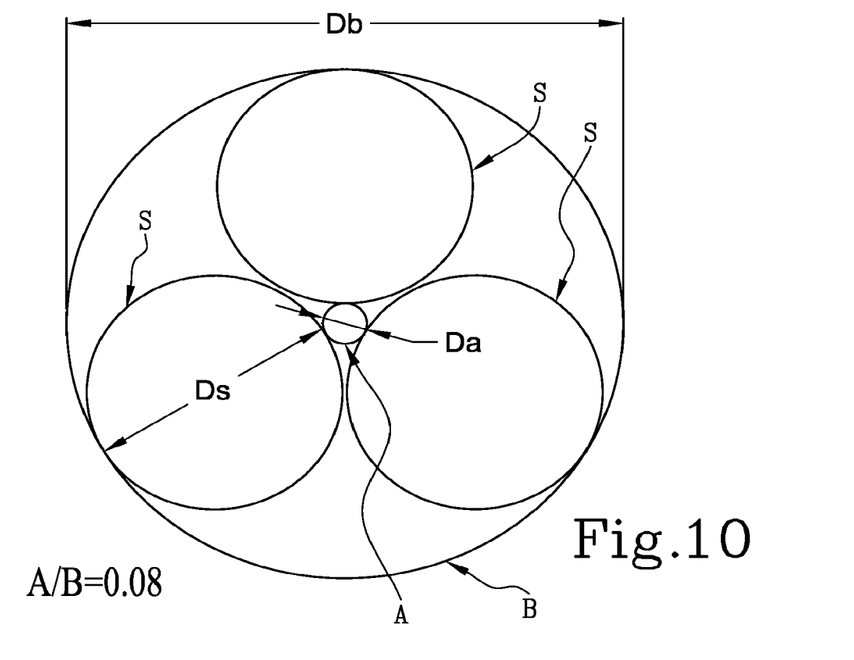
Figure 11:
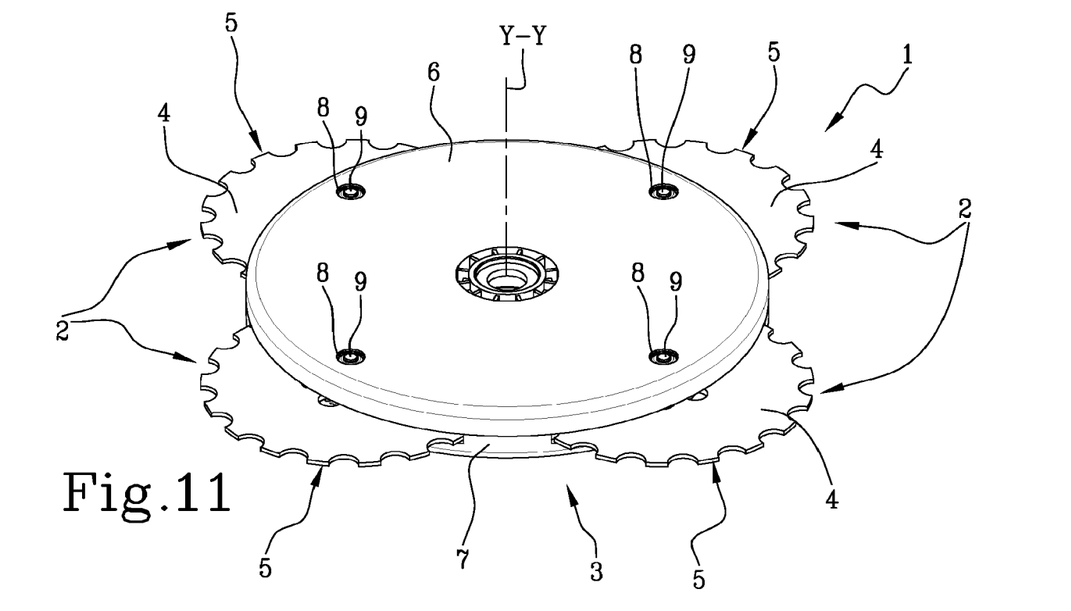
Figure 12:
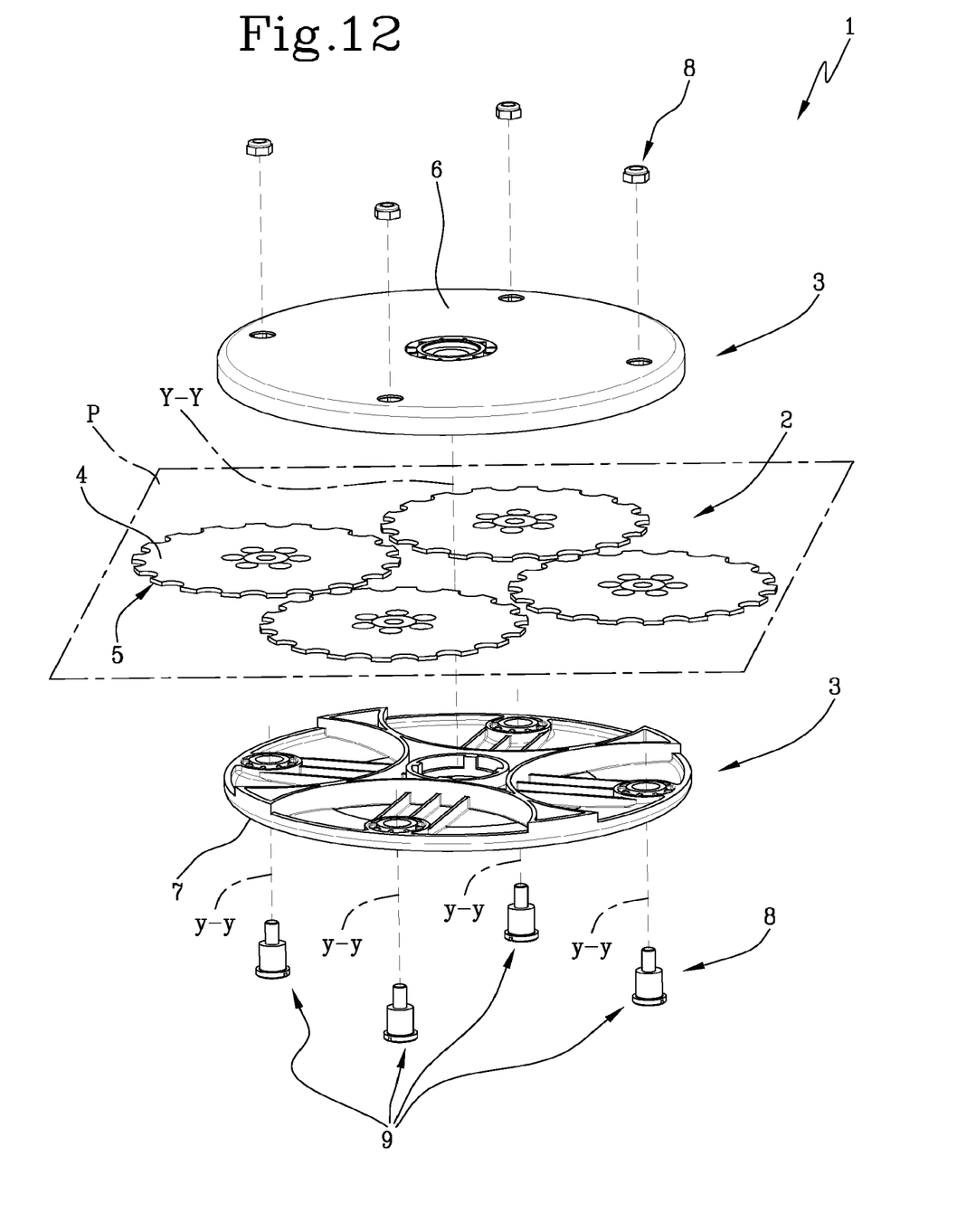
Figure 13:
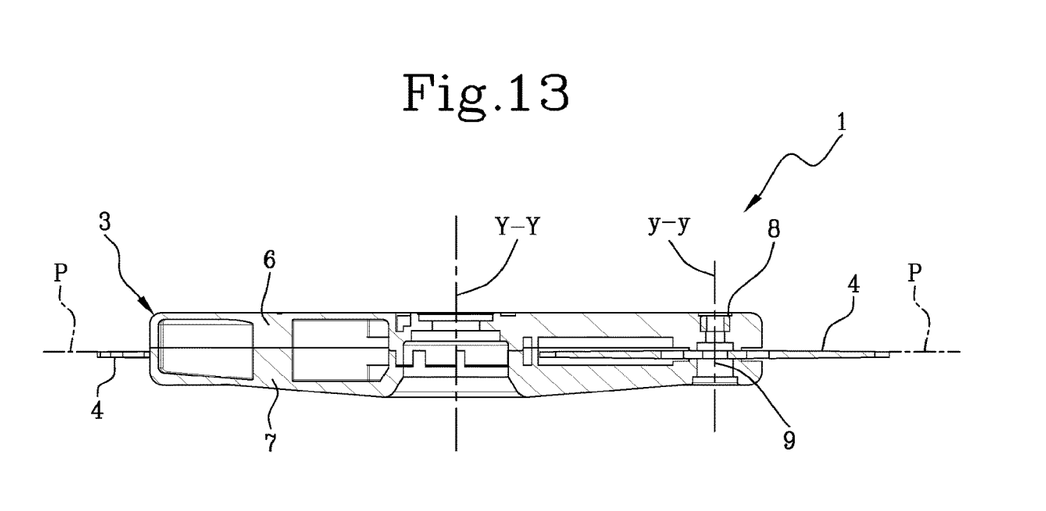

The following FIGS. 11 and 13 illustrate a variant of the head 1 made according to the model of FIGS. 6 and 7 or comprising a plurality of cutting elements 2 defined by four cutting elements.

Each cutting element 2 defines, during the rotation of the support element 3, a circular-shaped cutting generatrix S.

Each cutting element is coplanar with the other cutting elements belonging to the plurality of cutting elements 2 so as to define a cutting plane P.

In the figures it is possible to appreciate that the preferred variant of the cutting element 2 is defined by a discoid body 4 having a plurality of teeth 5 at the periphery thereof.

The plurality of elements of cutting elements 2 is coupled to the support element 3 through a plurality of pins 9.

Said plurality of pins 9 is uniformly distributed on the support element 3, having an angular sector of 360°, a staggered distribution of 90°.

Said plurality of pins 9 is distributed on a circumference having radius and centre in the vertical rotation axis Y-Y of the support element 3.

A cutting element 2 is fitted at each pin 9 so as to be rotatably idle about the pin 9 and trapped inside the support element 3.

The support element 3 is preferably defined by a discoid body with an upper plate 6 and a lower plate 7.

The lower and upper plate 6,7 can be closed together in packs due to fastening means 8. By closing the fastening means 8, the plurality of cutting elements is retained within the lower 7 and upper 6 plates, while by opening the fastening means 8 it is possible to open the plates to replace one or more cutting elements 2.

Figure 14:
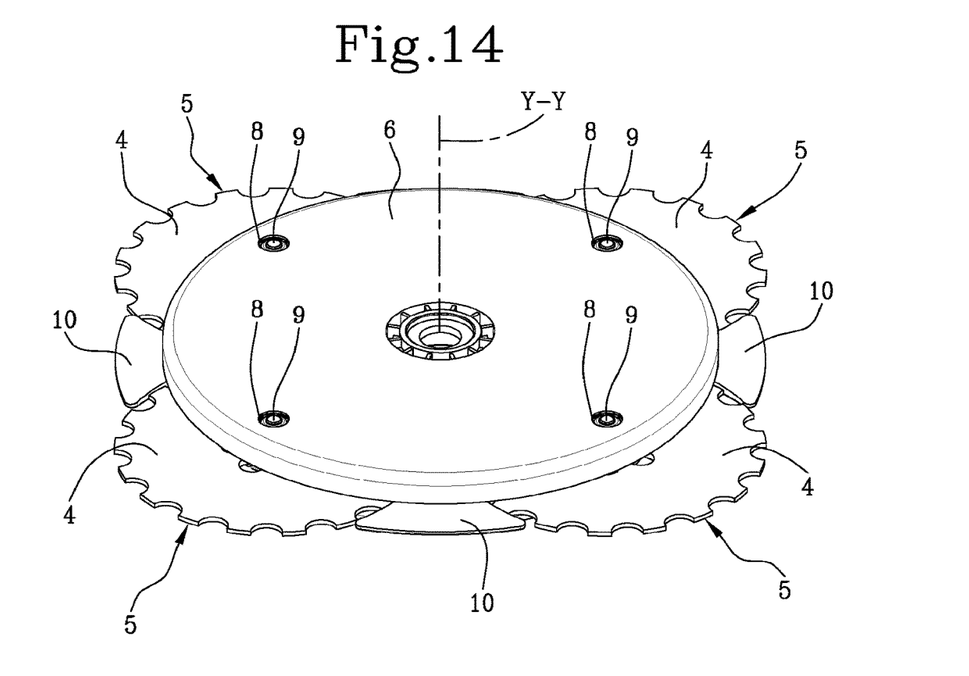
Figure 15:
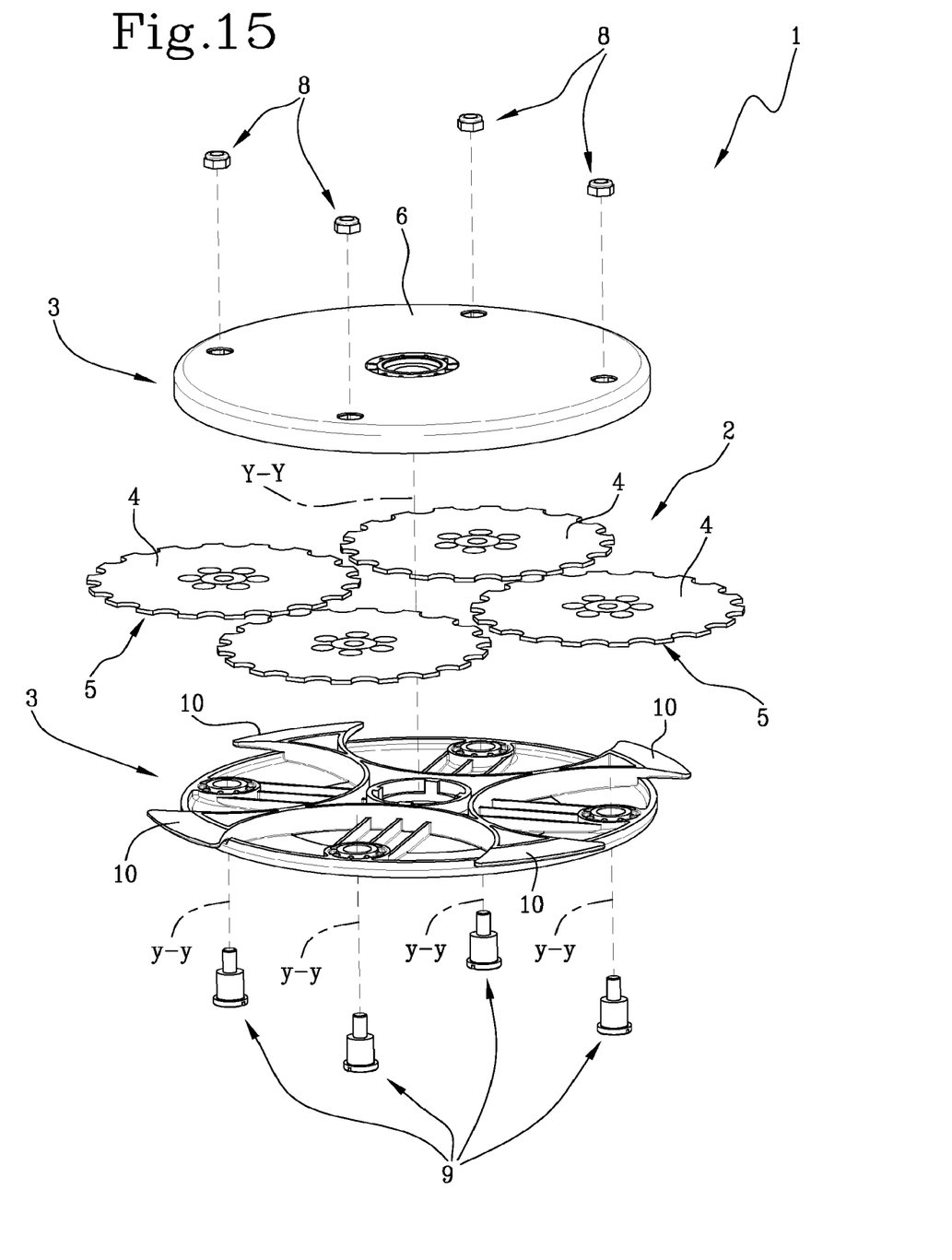
Figure 16:
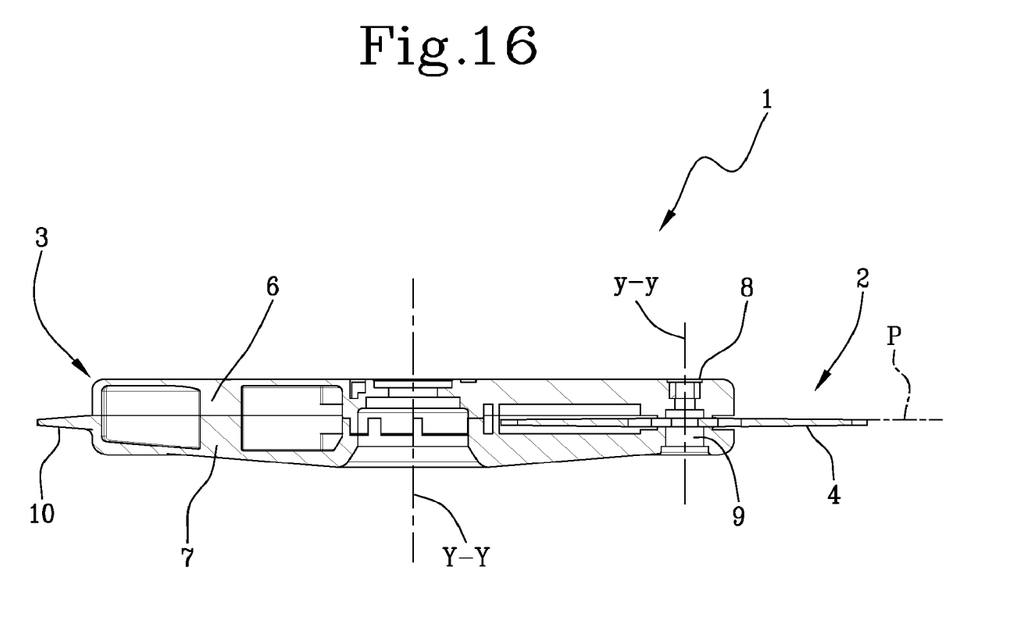

A second variant of the head 1 of FIGS. 6 and 7 is illustrated in FIGS. 14 and 16. The head 1 has arcuate projections 10 coupled to the outer periphery of the support element 3, more precisely on the peripheral edge from which the plurality of cutting elements 2 project, and are integral therewith.

The projections 10 have different functions. In the event of pronounced wear of the cutting elements 2, the arcuate projections 10 protect the cutting elements 2 from further wear. As the cutting element 2 is consumed, the head 1 could reach a configuration where it would be entirely devoid of a cutting surface since the cutting elements 2 are no longer active. As a result of the arcuate projections 10, in addition to favouring a protection of the residual part of the plurality of cutting elements 2 which remains intact, an additional cutting surface is generated by virtue of the rotation of the support element 3.

In addition, by filling the spaces between a pair of contiguous cutting elements 2, the projections 10 prevent the grass from being transported by the plurality of cutting elements 2 inside the support element 3 thus preventing the accumulation of debris grass from compromising the rotation of the plurality of cutting elements 2 around the axes y-y thereof. By exploiting the operating principles of a planetary gearbox with a head 1 as conceived, the Applicant was able to determine the overall cutting diameter portion on the support element and the area of the support element 3 not reached by the plurality of optimal cutting elements 2 which allows good cutting performance and good shock absorption.

Thereby, in addition to ensuring a better performance of the brush cutter, it has created a cutting tool which is less subject to wear and which is better able to absorb the impact of an obstacle.

In addition, even in the event of tool wear, the Applicant has created an additional element, the plurality of projections (10), which allow to support the plurality of cutting elements in the cutting steps.

The invention claimed is:

1. A head (1) for brush cutters, comprising:
a support element (3) having a discoid shape and connectable to a drive shaft of a brush cutter so as to be set in rotation about a vertical rotation axis (Y-Y);
a plurality of pins (9), connected to the support element (3), spaced equally apart along a 360° angular sector of the support element (3);
a plurality of cutting elements (2) connected to the plurality of pins (9), so that each cutting element (2) is coupled to a respective one of the pins (9), each said cutting element (2) being free to rotate about the axis of symmetry (y-y) of the pin (9) onto which the cutting element is fitted, thereby defining a cutting generatrix (S); said plurality of cutting elements (2) being arranged in such a way as to provide the respective cutting generatrices (S) tangent, in a part distal to the vertical rotation axis (Y-Y), to an overall cutting diameter (Db) defining the overall cutting surface of the head, and tangent, in a part proximal to the vertical rotation axis (Y-Y), to a fictitious circumference (A), defining a central portion of the support element (3) not reached by the plurality of cutting elements (2);
wherein the A/Db ratio is comprised between 0.06 and 0.3;
wherein the head (1) further comprises a plurality of fixed projections (10) solidly joined to the support element (3) so that each of the fixed projections defines, during the rotation of the support element about the vertical rotation axis (Y-Y), a cutting surface and prevents accumulation of debris from compromising the rotation of a further cutting element to support the plurality of cutting elements (2).

2. The head (1) according to claim 1, wherein said plurality of cutting elements (2) is defined by a set of three cutting elements spaced apart from one another by 120°, relative to an angular sector of 360°.

3. The head (1) according to claim 2, wherein the A/Db ratio is comprised between 0.06 and 0.15.

4. The head (1) according to claim 1, wherein said plurality of cutting elements (2) is defined by a set of four cutting elements spaced apart from one another by 90°, relative to an angular sector of 360°.

5. The head (1) according to claim 4, wherein the A/Db ratio is comprised between 0.16 and 0.3.

6. The head according to claim 1, wherein said support element (3) is defined by an upper plate (6) and a lower plate (7) that can be closed together in a pack through fastening means (8), in order to retain within them the plurality of pins (9) and the plurality of cutting elements (2); each said cutting element (2) being rotatably and idly coupled to the respective pin (9) it is fitted onto.

7. The head according to claim 1, wherein each cutting element (2) is defined by a disk body (4) having a plurality of teeth (5) on the periphery thereof.

8. The head (1) according to claim 1, wherein each of the fixed projections (10) extends from the periphery of the support element (3) and away therefrom, filling an empty space defined by a pair of cutting generatrices (S) belonging to two mutually contiguous cutting elements (2).

9. The head (1) according to claim 1, wherein the plurality of cutting elements (2) each has a cutting element (2) coplanar with the other cutting elements belonging to the plurality (2) of cutting elements.

* * * * *